United States Patent
Hong et al.

(10) Patent No.: US 10,262,183 B2
(45) Date of Patent: Apr. 16, 2019

(54) USER AUTHENTICATION DEVICE, INPUT SENSING MODULE FOR THE SAME, AND METHOD OF AUTHENTICATING USER

(71) Applicant: Samsung Display Co., Ltd., Yongin-si (KR)

(72) Inventors: Won-ki Hong, Suwon-si (KR); Jongseo Lee, Yongin-si (KR)

(73) Assignee: Samsung Display Co., Ltd., Yongin-si (KR)

(*) Notice: Subject to any disclaimer, the term of this patent is extended or adjusted under 35 U.S.C. 154(b) by 63 days.

(21) Appl. No.: 15/289,494

(22) Filed: Oct. 10, 2016

(65) Prior Publication Data

US 2017/0293797 A1     Oct. 12, 2017

(30) Foreign Application Priority Data

Apr. 8, 2016 (KR) ........................ 10-2016-0043662

(51) Int. Cl.
*G06K 9/00* (2006.01)
*G06K 9/62* (2006.01)
(Continued)

(52) U.S. Cl.
CPC ...... *G06K 9/00087* (2013.01); *B60R 25/2027* (2013.01); *G06F 21/32* (2013.01);
(Continued)

(58) Field of Classification Search
CPC ........... G06K 9/00087; G06K 9/00053; G06K 9/00006; G06K 9/0002; G06K 9/00382; G06K 9/00362; G06K 9/00013; G06K 9/00536; B60R 25/252; B60R 25/25; G06F 21/32; G06F 3/044; G06F 3/041; G06F 3/0412; G02F 1/13338; H04L 9/3231; F41A 17/066
See application file for complete search history.

(56) References Cited

U.S. PATENT DOCUMENTS

| | | | |
|---|---|---|---|
| 5,335,288 A | 8/1994 | Faulkner | |
| 5,745,591 A * | 4/1998 | Feldman | ............... G06F 3/0395 340/5.83 |

(Continued)

FOREIGN PATENT DOCUMENTS

| | | |
|---|---|---|
| KR | 10-2009-0084767 | 8/2009 |
| KR | 10-2011-0064621 | 6/2011 |

(Continued)

OTHER PUBLICATIONS

Non-Final Office Action dated Feb. 21, 2019, Issued in U.S. Appl. No. 16/239,547.

*Primary Examiner* — Michael S Osinski
(74) *Attorney, Agent, or Firm* — H.C. Park & Associates, PLC

(57) ABSTRACT

An electronic device including an input sensing module including a sensing surface to which a palm is input, the sensing surface having a three-dimensional shape, and a control module comparing user palm information with input palm information sensed by the input sensing module to output an authentication signal when a number of data points of the user palm information consistent with the stored input palm information is equal to or greater than a predetermined number.

23 Claims, 16 Drawing Sheets

(51) Int. Cl.
   *B60R 25/20* (2013.01)
   *G06F 21/32* (2013.01)
(52) U.S. Cl.
   CPC ....... *G06K 9/0002* (2013.01); *G06K 9/00053* (2013.01); *G06K 9/6215* (2013.01)

(56) References Cited

U.S. PATENT DOCUMENTS

| | | | |
|---|---|---|---|
| 5,793,881 A | 8/1998 | Stiver et al. | |
| 6,100,811 A * | 8/2000 | Hsu | B60H 1/00642 340/426.36 |
| 6,163,616 A * | 12/2000 | Feldman | G06F 3/0395 382/115 |
| 6,563,940 B2 | 5/2003 | Recce | |
| 6,628,810 B1 * | 9/2003 | Harkin | A61B 5/1171 382/116 |
| 6,927,668 B1 * | 8/2005 | Odle | B60R 25/252 340/426.28 |
| 7,710,245 B2 | 5/2010 | Pickering | B60R 25/2045 340/426.28 |
| 8,150,573 B2 | 4/2012 | Shimizu et al. | |
| 8,538,090 B2 | 9/2013 | Ishii | |
| 8,767,195 B2 * | 7/2014 | Kono | G06K 9/00 356/71 |
| 8,892,272 B1 * | 11/2014 | Wooding | B60R 25/252 340/5.52 |
| 8,988,191 B2 * | 3/2015 | Zhang | G06F 21/32 340/5.53 |
| 9,116,567 B2 | 8/2015 | Alberth, Jr. et al. | |
| 9,460,575 B2 * | 10/2016 | Park | G07C 9/00134 |
| 9,477,869 B2 * | 10/2016 | Liu | G06K 9/001 |
| 2001/0033254 A1 * | 10/2001 | Furusato | G06F 3/0414 345/55 |
| 2002/0001400 A1 * | 1/2002 | Yamazaki | G06F 21/32 382/115 |
| 2002/0034321 A1 * | 3/2002 | Saito | G06K 9/00006 382/124 |
| 2004/0136573 A1 | 7/2004 | Sato | |
| 2005/0084138 A1 | 4/2005 | Inkster et al. | |
| 2006/0080254 A1 * | 4/2006 | Chigira | G06F 21/32 705/44 |
| 2006/0145825 A1 * | 7/2006 | Mc Call | B60R 25/2045 340/426.35 |
| 2006/0186987 A1 * | 8/2006 | Wilkins | B60R 25/252 340/5.53 |
| 2009/0195659 A1 | 8/2009 | Nagata et al. | |
| 2010/0109838 A1 * | 5/2010 | Fisher | G07C 9/00158 340/5.72 |
| 2010/0226539 A1 * | 9/2010 | Ishii | G06F 3/0425 382/104 |
| 2011/0142353 A1 * | 6/2011 | Hoshino | G06K 9/00375 382/203 |
| 2011/0154485 A1 * | 6/2011 | Hyun | H04L 9/3231 726/19 |
| 2012/0169400 A1 * | 7/2012 | Liu | G06F 3/0416 327/517 |
| 2013/0135247 A1 * | 5/2013 | Na | G06F 21/32 345/174 |
| 2014/0000938 A1 * | 1/2014 | Yoo | H05K 1/02 174/250 |
| 2014/0028928 A1 * | 1/2014 | Yu | G02F 1/13338 349/12 |
| 2014/0132553 A1 | 5/2014 | Park et al. | |
| 2014/0133710 A1 * | 5/2014 | Hama | G06K 9/00087 382/115 |
| 2014/0139447 A1 * | 5/2014 | Kang | G06F 3/044 345/173 |
| 2014/0253488 A1 * | 9/2014 | Vukovic | G06F 3/0418 345/174 |
| 2014/0294261 A1 * | 10/2014 | Abe | G06K 9/00006 382/124 |
| 2014/0362013 A1 | 12/2014 | Nikoozadeh et al. | |
| 2015/0086090 A1 * | 3/2015 | Jung | G06K 9/00013 382/124 |
| 2015/0137938 A1 * | 5/2015 | Slaby | G07C 9/00079 340/5.53 |
| 2015/0161836 A1 * | 6/2015 | Park | G07C 9/00134 340/5.51 |
| 2015/0163220 A1 * | 6/2015 | Gaston | G06Q 20/341 726/5 |
| 2015/0248799 A1 * | 9/2015 | Lee | G07C 9/00174 340/5.53 |
| 2015/0291032 A1 | 10/2015 | Kim et al. | |
| 2015/0356337 A1 * | 12/2015 | Liu | G06K 9/001 382/115 |
| 2016/0001781 A1 | 1/2016 | Fung et al. | |
| 2016/0062527 A1 * | 3/2016 | Lee | G06F 3/0412 345/173 |
| 2016/0313793 A1 * | 10/2016 | Hong | G06F 3/016 |
| 2016/0371533 A1 * | 12/2016 | Liu | G06K 9/00006 |
| 2017/0123558 A1 * | 5/2017 | Hong | G09G 3/001 |
| 2017/0124316 A1 * | 5/2017 | Slaby | G06F 21/32 |
| 2017/0139510 A1 * | 5/2017 | Lang | G01L 5/0038 |
| 2017/0193277 A1 * | 7/2017 | Hong | G06F 3/044 |
| 2017/0205924 A1 * | 7/2017 | Kim | G06F 3/0412 |
| 2017/0262690 A1 * | 9/2017 | Zhang | G06K 9/00013 |
| 2017/0285782 A1 * | 10/2017 | Yu | G06F 3/041 |
| 2017/0308117 A1 * | 10/2017 | Park | G06K 9/00355 |
| 2017/0371489 A1 * | 12/2017 | Hong | G06F 3/0414 |
| 2018/0031885 A1 * | 2/2018 | Nakamori | G01L 1/146 |
| 2018/0059822 A1 * | 3/2018 | Seo | G06F 3/044 |
| 2018/0260051 A1 * | 9/2018 | Kim | G06F 3/041 |

FOREIGN PATENT DOCUMENTS

| | | |
|---|---|---|
| KR | 10-2014-0062269 | 5/2014 |
| KR | 10-2014-0069608 | 6/2014 |
| KR | 10-2014-0129710 | 11/2014 |
| WO | 93/16441 | 8/1993 |
| WO | 97/08648 | 3/1997 |
| WO | 03/069540 | 8/2003 |
| WO | 03/098537 | 11/2003 |
| WO | 2013/162783 | 10/2013 |

* cited by examiner

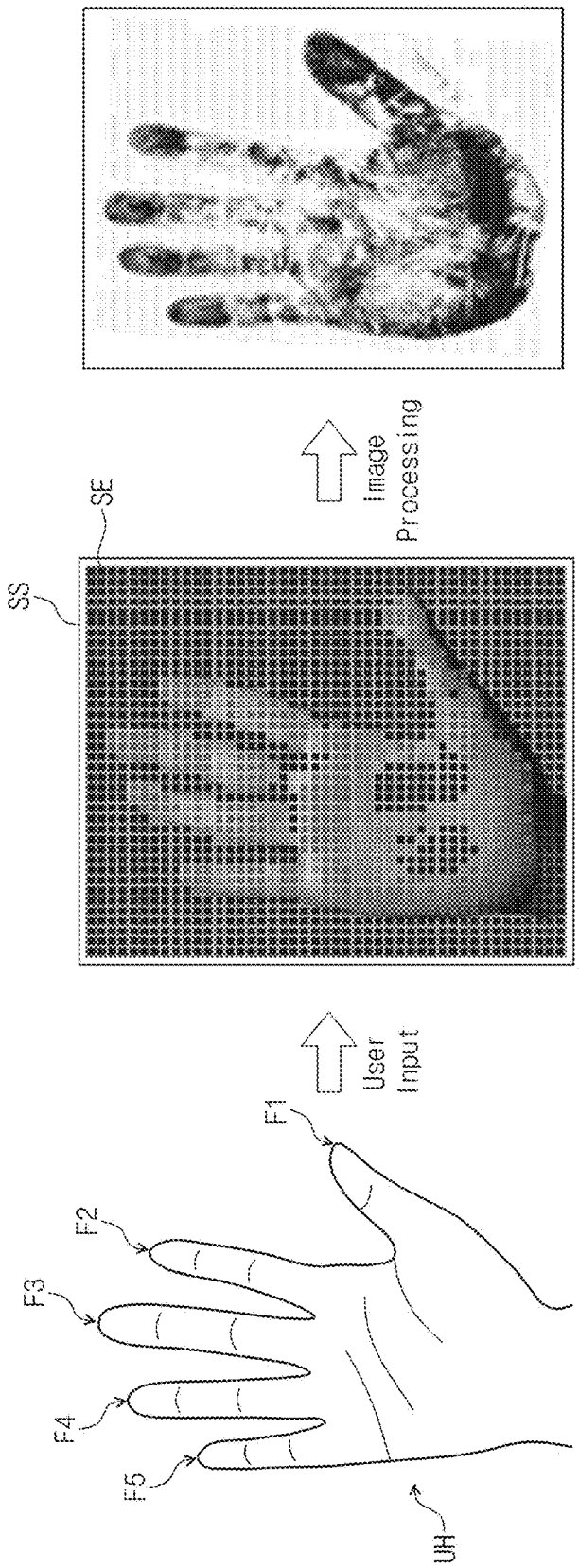

USER AUTHENTICATION DEVICE, INPUT SENSING MODULE FOR THE SAME, AND METHOD OF AUTHENTICATING USER

CROSS-REFERENCE TO RELATED APPLICATION

This application claims priority from and the benefit of Korean Patent Application No. 10-2016-0043662, filed on Apr. 8, 2016, which is hereby incorporated by reference for all purposes as if fully set forth herein.

BACKGROUND

Field

Exemplary embodiments of the present invention relate to a user authentication device, and input sensing module for the same, and a method of authenticating a user. More particularly, exemplary embodiments relate to a user authentication device capable of sensing information regarding a user's palm, an input sensing module for the user authentication device, and a method of authenticating the user.

Discussion of the Background

In order to access objects, such as electronic devices, cars, buildings, etc., a user authentication is typically required. In general, a password input is required to access the electronic devices, a possession of a car key is required to start the cars, and an authentication key or a password input is required to enter the buildings.

The above-described user authentications require that the user utilize separate authentication processes. That is, the user takes specific actions to perform each authentication process.

The above information disclosed in this Background section is only for enhancement of understanding of the background of the inventive concept, and, therefore, it may contain information that does not form the prior art that is already known in this country to a person of ordinary skill in the art.

SUMMARY

Exemplary embodiments provide a user authentication device capable of precisely authenticating a user on the basis of natural behavior of the user.

Exemplary embodiments also provide an input sensing module arranged in the user authentication device.

Exemplary embodiments also provide a method of authenticating the user without the user being aware of user authenticating procedures.

Additional aspects will be set forth in the detailed description which follows, and, in part, will be apparent from the disclosure, or may be learned by practice of the inventive concept.

An exemplary embodiment discloses a user authenticating device including an input sensing module and a control module. The input sensing module includes a sensing surface to which a palm of a user is input, and the sensing surface has a three-dimensional shape. The control module compares input palm information sensed by the input sensing module with user palm information to output an authentication signal when the number of data points of the input palm information consistent with the stored user palm information is equal to or greater than a predetermined number.

An exemplary embodiment also discloses a method of authenticating a user, including: sensing an input by a palm of a user, which occurs on a sensing surface of an input sensing module, the sensing surface having a three-dimensional shape; comparing input palm information sensed from the input sensing module with user palm information previously-stored in a memory; and generating an authentication signal when the number of data points of the input palm information consistent with the stored user palm information is equal to or greater than a predetermined reference number.

An exemplary embodiment also discloses an input sensing module including a flexible base member, a plurality of sensing electrodes disposed on the base member, and a flexible protective member disposed on the base member and protecting the sensing electrodes. The flexible protective member has a three-dimensional sensing surface to which a palm of a user is input.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

FIG. 6A is a view showing a method of processing a signal according to an exemplary embodiment.

DETAILED DESCRIPTION OF THE ILLUSTRATED EMBODIMENTS

Figure 1:
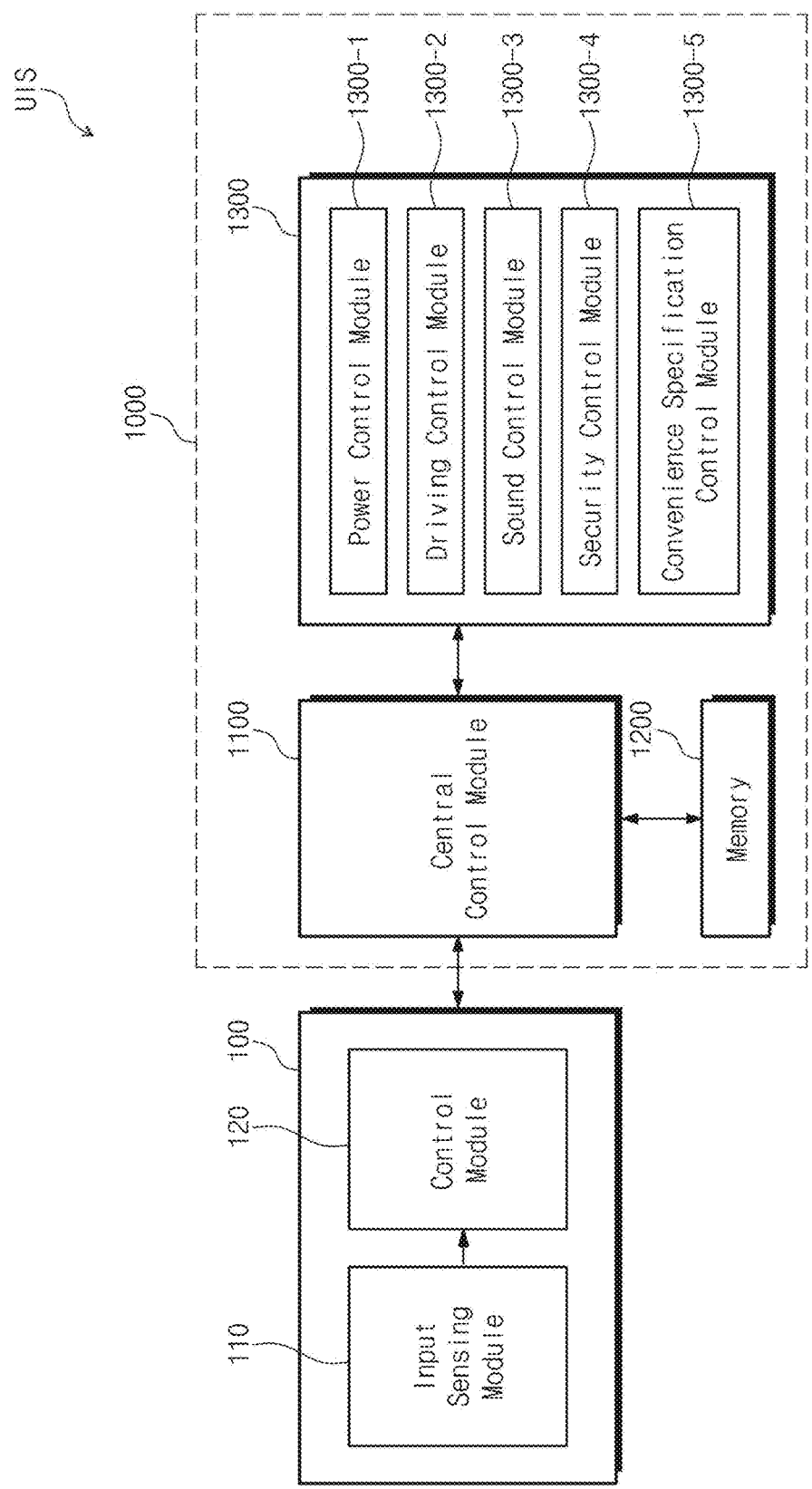
FIG. 1 is a block diagram showing a user authenticating system according to an exemplary embodiment of the present invention.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. The regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Figure 2:
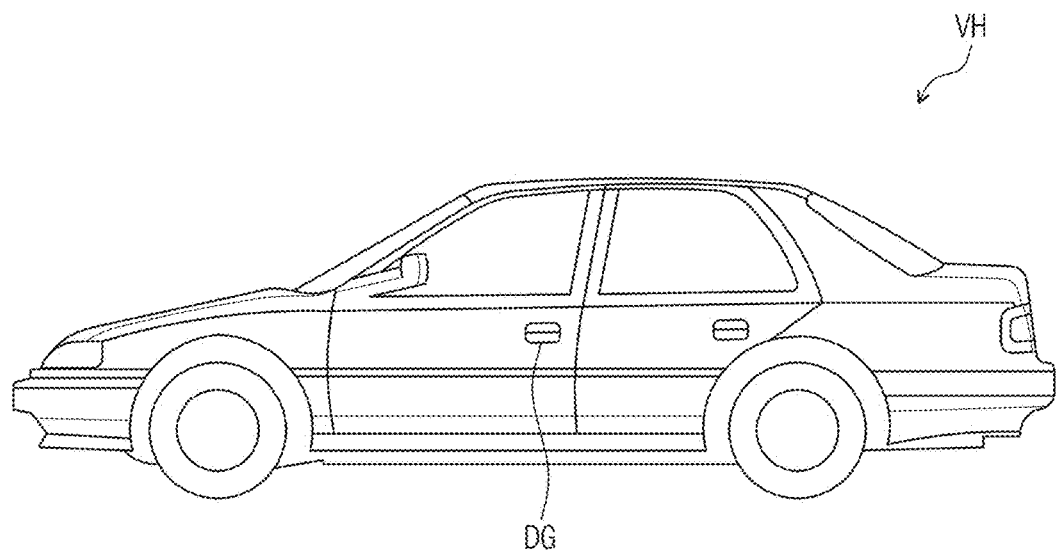
FIG. 2 and FIG. 3 are views showing a user authenticating system used with a vehicle according to an exemplary embodiment.
Figure 3:
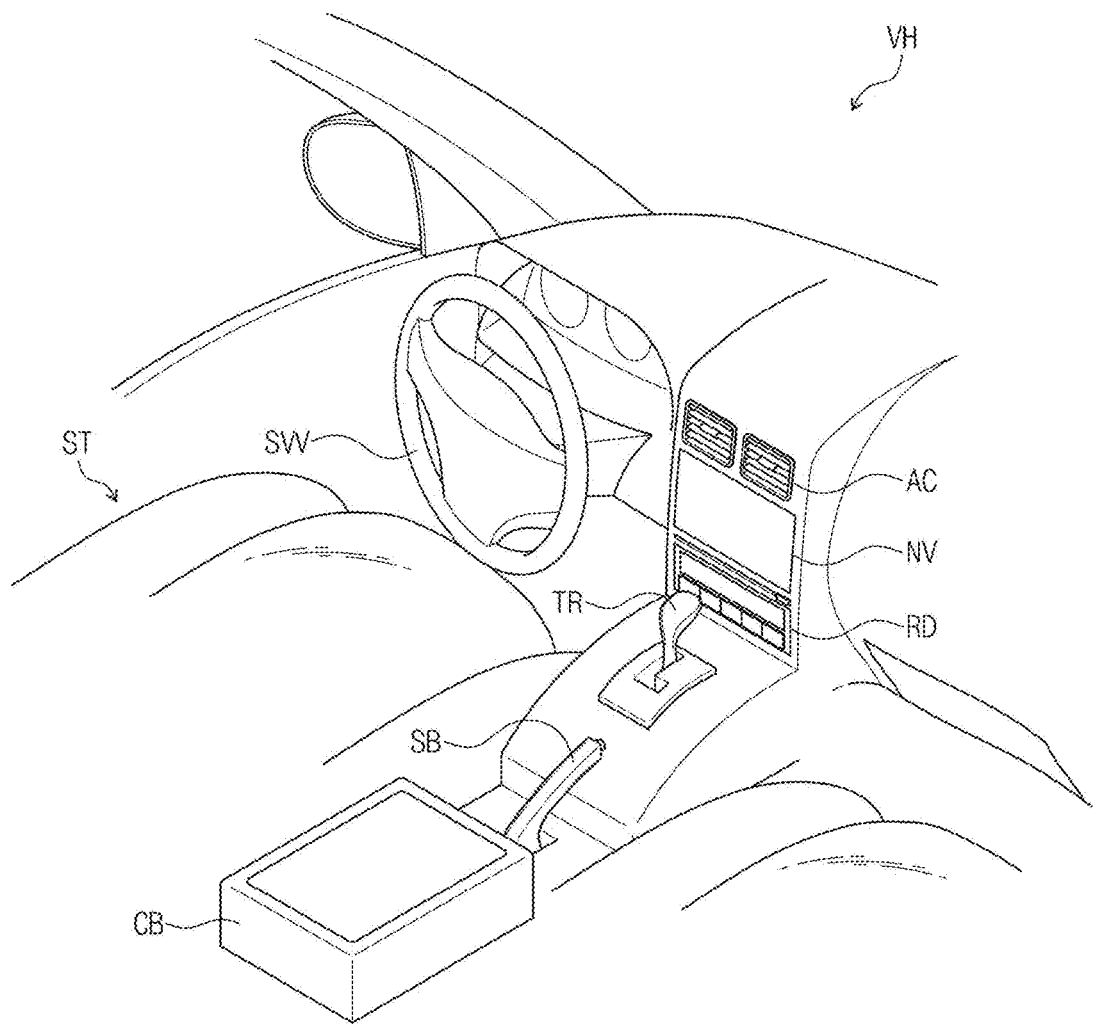
Figure 4:
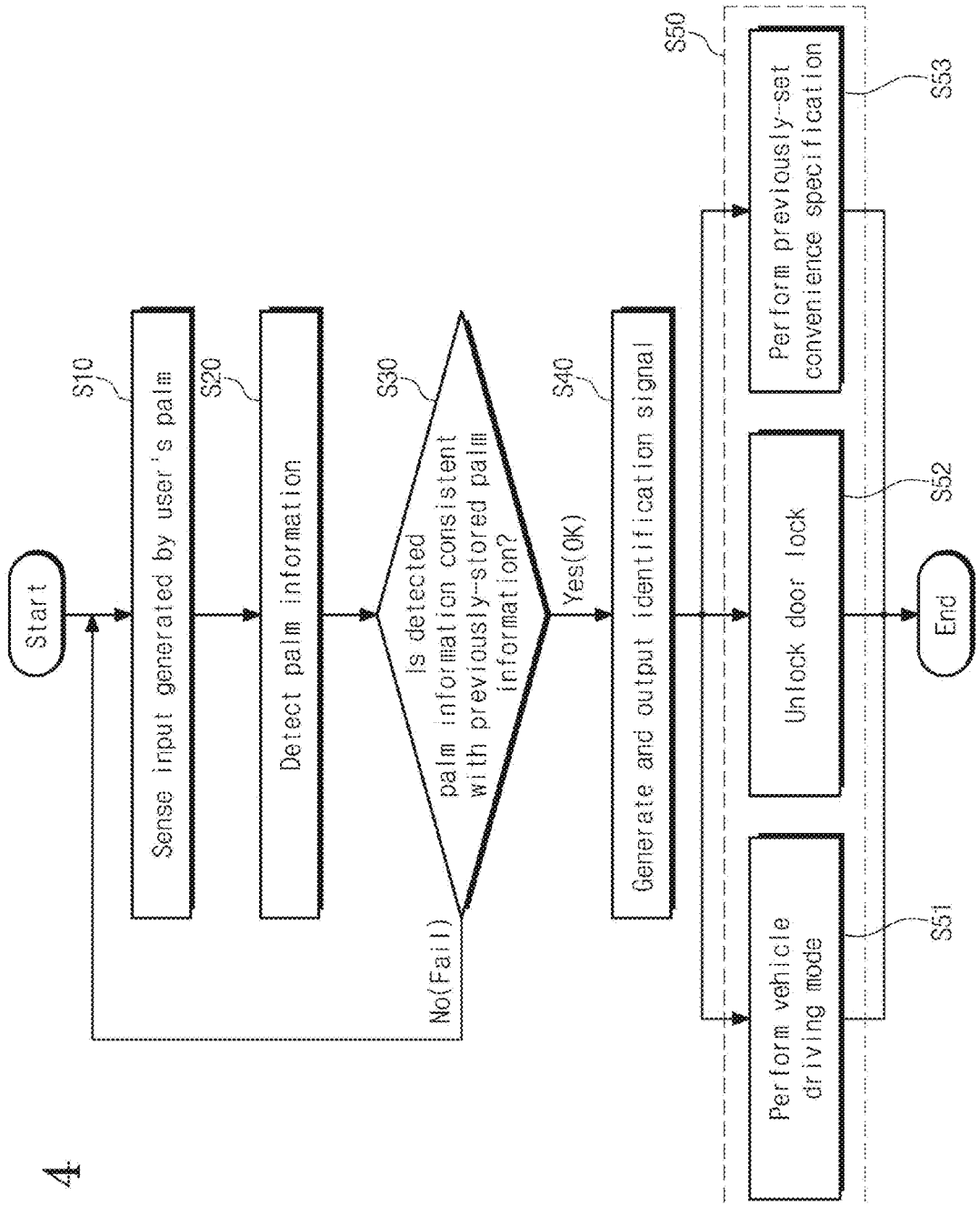
FIG. 4 is a flowchart showing a method of authenticating a user according to an exemplary embodiment.

FIG. 1 is a block diagram showing a user authenticating system UIS according to an exemplary embodiment. FIGS. 2 and 3 are views showing a user authenticating system UIS used with a vehicle VH according to an exemplary embodiment. FIG. 4 is a flowchart showing a method of authenticating a user according to an exemplary embodiment.

In the present exemplary embodiment, the vehicle VH will be described as a device to which the user authenticating system UIS is applied, but the device should not be limited to the vehicle VH. The user authenticating system UIS according to the present exemplary embodiment may be applied to other devices that requires a user authentication.

The user authenticating system UIS according to the present exemplary embodiment includes a user authentication device 100 and an electronic device control system 1000 operatively linked with the user authentication device 100. In the present exemplary embodiment, the electronic device control system 1000 may be, but is not limited to, a vehicle control system.

The user authentication device 100 includes an input sensing module 110 and a control module 120. The input sensing module 110 provides a sensing surface with which the user's palm makes contact. The input sensing module 110 senses an "input by the palm", which occurs on the sensing surface. Here, the term "input by the palm" used herein means a light touch occurring on the sensing surface of the input sensing module 110 by the stretched palm, a touch occurring by applying a predetermined pressure to the sensing surface of the input sensing module 110 by the stretched palm, a touch occurring by the palm holding the sensing surface of the input sensing module 110, a light touch occurring on the sensing surface of the input sensing module 110 by a portion of the palm, a touch occurring by applying a predetermined pressure to the sensing surface of the input sensing module 110 by a portion of the stretched palm, or a touch occurring by a portion of the palm holding the sensing surface of the input sensing module 110.

The control module 120 receives electrical signals, e.g., sensing signals, from the input sensing module 110. The control module 120 senses the information regarding the palm (hereinafter, referred to as input palm information) from the sensing signals. The control module 120 compares previously-stored palm information with the input palm information and outputs an authentication signal in accordance with the compared result.

The user authentication device 100 may be installed on various components of the vehicle VH. As shown in FIG. 2, the user authentication device 100 may be installed on a door grip DG. As shown in FIG. 3, the user authentication device 100 may be installed on at least one of a steering wheel SW, a transmission lever TR, a console box CB, and a handle of a side brake SB. The input sensing module 110 may provide a sensing surface corresponding to an appearance of the door grip DG, the steering wheel SW, the transmission lever TR, the console box CB, and the handle of the side brake SB. That is, the input sensing module 110 provides the sensing surface having a three-dimensional shape. The sensing surface having the three-dimensional shape will be described in detail later.

A vehicle control system 1000 includes a central control module 1100, a memory 1200, and a functional electronic module 1300. The functional electronic module 1300 includes a power control module 1300-1, a driving control module 1300-2, a sound control module 1300-3, a security control module 1300-4, and a convenience specification control module 1300-5. However, the functional electronic module 1300 should not be limited to the above-mentioned modules.

The central control module 1100 controls an overall operation of the functional electronic module 1300 and the vehicle VH. The central control module 1100 receives the authentication signal from the user authentication device 100. The central control module 1100 includes a receiver corresponding to a transmitter of the user authentication device 100 to receive the authentication signal. The central control module 1100 may transmit and receive the authentication signal to and from the user authentication device 100 using wired and/or wireless communications.

The memory 1200 stores security information of the vehicle, which is set by an owner of the vehicle. This security information may include information of the functional electronic module 1300, information regarding a smart key, and information regarding the convenience specification set corresponding to a plurality of drivers. The vehicle owner may be one of the plurality of drivers.

The power control module 1300-1 provides power to electronic modules arranged in the vehicle, and the driving control module 1300-2 controls operation of the transmission lever TR, the side brake SB, and the steering wheel SW. The sound control module 1300-3 controls a sound system including audio, and the security control module 1300-4 controls locking and unlocking of the doors and windows.

The convenience specification control module 1300-5 controls an operation of various electronic devices arranged in the vehicle VH. For instance, the convenience specification control module 1300-5 may control ON and OFF of a navigation NV, a height of a seat, a channel of a radio RD, and a set temperature of an air conditioner AC. Control targets of the convenience specification control module 1300-5 should not be limited thereto.

Hereinafter, the method of authenticating the user will be described in detail with reference to FIG. 4. The input generated by the user's palm is sensed (S10). Here, the user may be a person who sits on a driver's seat. The user holds the door grip DG while entering into the driver's seat. In addition, the user touches or holds various components in the vehicles, e.g., the steering wheel SW, the transmission lever TR, the side brake SB, and the console box CB while starting an engine of the vehicle after sitting on the driver's seat. The input sensing module 110 installed on the components of the vehicle senses the input by the user and outputs the sensing signals.

The input palm information is detected based on the sensing signals from the input sensing module 110 (S20). The control module 120 converts the electrical signals to digital signals and image-processes the digital signals to detect the input palm information.

The detected input palm information is compared with the previously-stored palm information (S30). When the detected input palm information is not consistent with (not equivalent to) the previously-stored palm information according to the compared result, the input by the user's palm is sensed again (S10). The control module 120 reads out new sensing signals from the input sensing module 110. When the detected input palm information is consistent with (equivalent to) the previously-stored palm information according to the compared result, the control module 120, the control module 120 generates the authentication signal and outputs the generated authentication signal (S40).

According to the above, user authentication may be carried out through a user's natural behavior occurring when the user gets in the vehicle and starts the engine of the vehicle. The user authentication method according to the present exemplary embodiment does not require a specific behavior by the user for user authentication to be accomplished.

When user authentication is completed, the central control module 1100 operates the functional electronic module 1300 (S50). For instance, the driving control module 1300-2 executes a vehicle driving mode (S51). The security control module 1300-4 unlocks the door lock (S52). The central control module 1100 matches the received authentication signal with information regarding the plurality of drivers stored in the memory 1200, and then operates the convenience specification control module 1300-5 in accordance with the convenience specification information set corresponding to the matched driver (S53). For example, the height of the seat ST may be controlled, the air conditioner AC may be operated, or a frequency of the radio RD may be set in accordance with the set information regarding the convenience specification.

Figure 5:
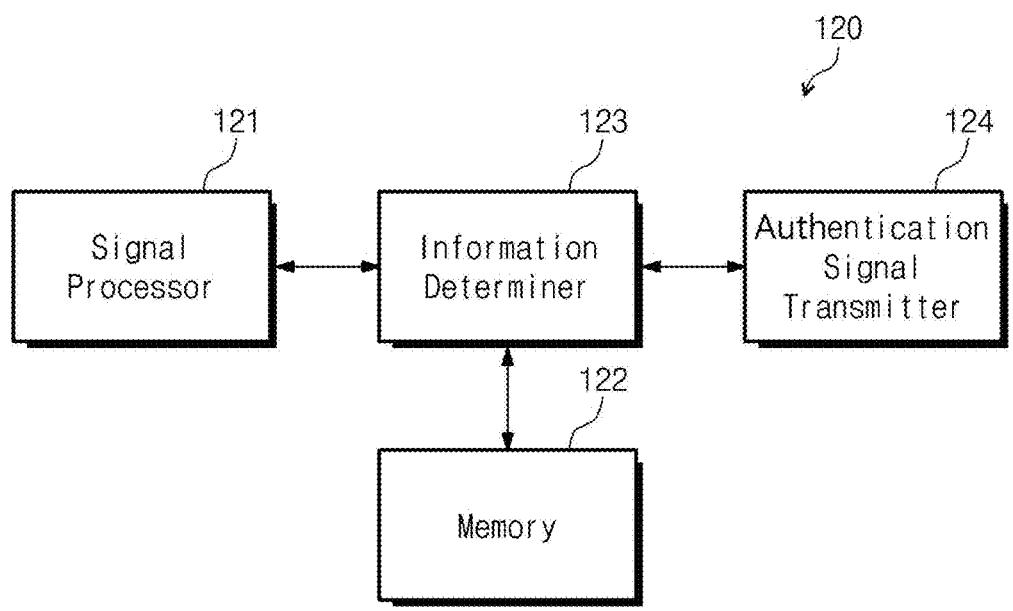
FIG. 5 is a block diagram showing a control module of a user authentication device according to an exemplary embodiment.
Figure 6B:
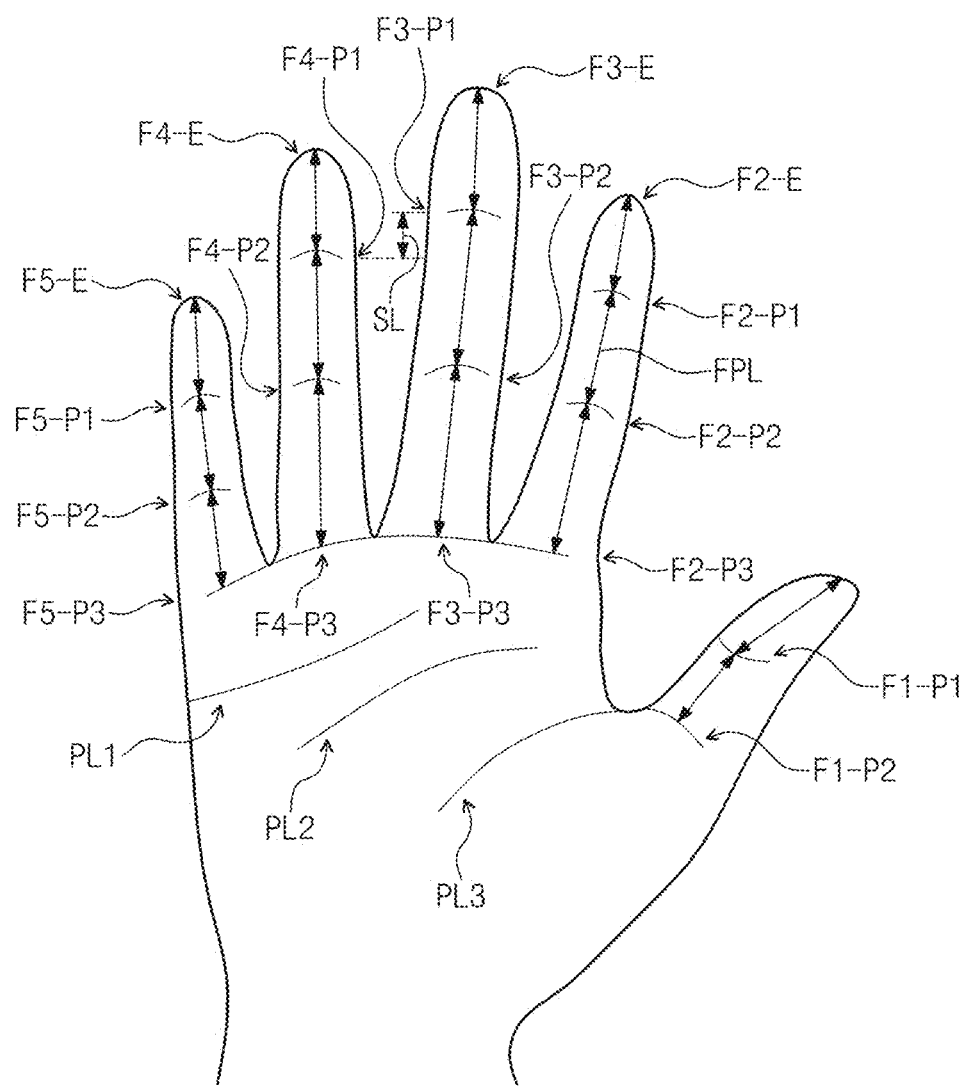
FIG. 6B is a view showing information regarding a user's palm.
Figure 7A:
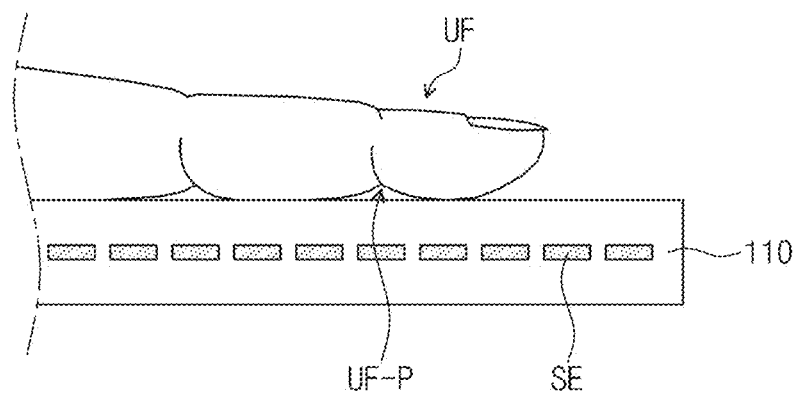
FIG. 7A and FIG. 7B are views showing user's fingers on an input sensing module according to an exemplary embodiment.
Figure 7B:
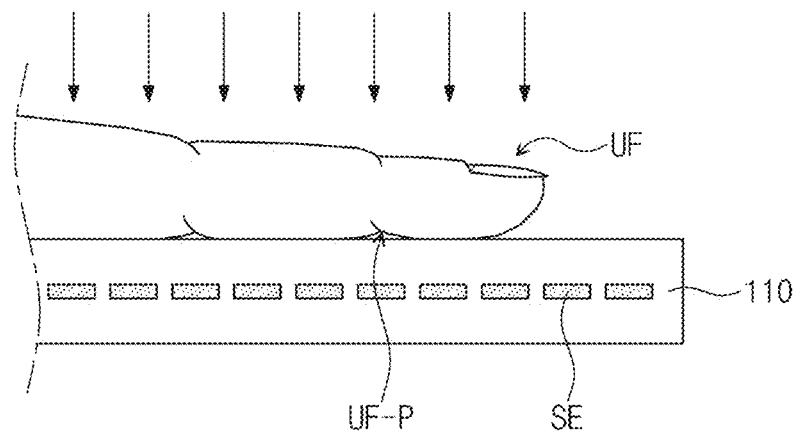

FIG. 5 is a block diagram showing a control module of a user authentication device according to an exemplary embodiment. FIG. 6A is a view showing a method of processing a signal according to an exemplary embodiment. FIG. 6B is a view showing information regarding a user's palm. FIGS. 7A and 7B are views showing a user's fingers on an input sensing module according to an exemplary embodiment.

Referring to FIG. 5, the control module 120 according to the present exemplary embodiment includes a signal processor 121, a memory 122, an information determiner 123, and an authentication signal transmitter 124. In the present exemplary embodiment, the central control module 1100 may transmit and receive the authentication signal to and from the user authentication device 100 in a wireless manner, and in this case, the authentication signal transmitter 124 may be omitted.

The signal processor 121 generates the input palm information from the sensing signals provided from the input sensing module 110. That is, the signal processor 121 generates the information regarding the palm input to the input sensing module 110.

The memory 122 stores the palm information regarding the palm information of the user. The memory 122 may store palm information regarding each of the users.

The information determiner 123 compares the palm information of the user stored in the memory 122 with the input palm information. The information determiner 123 generates the authentication signal according to the compared result.

The authentication signal transmitter 124 receives the authentication signal. The authentication signal transmitter 124 converts the authentication signal to a signal appropriate to be transmitted to the central control module 1100 (refer to FIG. 1) and transmits the converted signal. The authentication signal transmitter 124 may include a Bluetooth module, a local area communication module, a Zigbee communication module, or the like.

Hereinafter, the signal processing performed by the signal processor 121 will be described in detail with reference to FIGS. 6A and 6B.

Referring to FIG. 6A, the user's palm UH is input to the sensing surface SS of the input sensing module. FIG. 6A shows a plurality of sensing electrodes SE arranged corresponding to the sensing surface SS. Among the sensing electrodes SE, sensing electrodes SE overlapped with the uses' palm UH output the sensing signals. The sensing electrodes SE may output different sensing signals from each other in accordance with a contact form between the user's palm UH and the sensing surface SS. The signal processor 121 image-processes the received sensing signals to obtain a palm image. The signal processor 121 may extract characteristics of the palm of the user from the palm image. The extracted characteristics of the palm form the input palm information.

FIG. 6B shows the palm information obtained from the palm. The palm information shown in FIG. 6B may be stored in the memory 122 as data points representing the palm information of the user. The palm information shown in FIG. 6B may be detected as the input palm information by the signal processor 121.

The palm information may include lengths and shapes of fingers, widths of knuckles of fingers, lengths and shapes of palm lines, lengths between finger knuckles adjacent to each other, and associative relations between the finger knuckles corresponding to each other of fingers adjacent to each other.

As shown in FIG. 6B, a thumb F1 includes two knuckles F1-P1 and F1-P2. Each of index, middle, ring, and little fingers F2, F3, F4, and F5 includes three knuckles F2-P1 to F5-P3.

The lengths of the index, middle, ring, and little fingers F2, F3, F4, and F5 are obtained by measuring lengths between third knuckles F2-P3 to F5-P3 and edges F2-E to F5-E of the fingers. The shapes of the index, middle, ring, and little fingers F2, F3, F4, and F5 may be obtained as the image of the palm shown in FIG. 6A.

Each of the widths of the knuckles F1-P1 to F5-P3 of the fingers F1 to F5 may form the input palm information. The widths of the knuckles corresponding to each other of the index, middle, ring, and little fingers F2, F3, F4, and F5, i.e., widths of first knuckles F2-P1, F2-P2, F2-P3, F2-P4, and F2-P5, may form one authentication information group. Here, the width of the knuckle means a length in an extension direction of a knuckle line.

As shown in FIG. 6B, the shapes and lengths of the palm lines PL1, PL2, and PL3 may form the input palm information. The lengths FPL between the knuckles adjacent to each other among the finger knuckles F1-P1 to F5-P3 may form the palm information.

The palm information may include associative relationships between the finger knuckles corresponding to each of the other adjacent fingers. For instance, distances between the first knuckles F1-P1, F2-P1, F3-P1, F4-P1, and F5-P1 of consecutive fingers may form the palm information. The distance may be measured in a direction in which the fingers extend. FIG. 6B shows the distance SL between the first knuckle F3-P1 of the middle finger F3 and the first knuckle F4-P1 of the ring finger F4 as a representative example.

The sensing signals output from the sensing electrodes SE will be described in detail with reference to FIGS. 7A and 7B. FIGS. 7A and 7B show one finger UF disposed on the input sensing module 110 with two knuckles UF-P.

The sensing electrodes SE shown in FIG. 7A are capacitively coupled to the finger UF. When the sensing electrodes SE receive a detecting signal, the sensing electrodes SE are capacitively coupled to the finger UF to form a capacitor. In other words, the input sensing module 110 may be, but not limited to, an electrostatic capacitive type touch panel. The sensing electrodes SE may include a conductive material used to form the electrostatic capacitive type touch panel.

The sensing electrodes SE may be classified into two groups. The sensing electrodes SE overlapped with the three knuckles UF-P of the finger are referred to as a first group, and the other sensing electrodes are referred to as a second group.

The first group sensing electrodes SE form capacitors with the finger UF to have different capacitances from those of capacitors formed by the second group sensing electrodes SE and the finger UF. Accordingly, the first group sensing electrodes SE output the sensing signals different from those output from the second group sensing electrodes SE. The signal processor 121 (refer to FIG. 5) may obtain information regarding two knuckles UF-P based on a voltage level of the sensing signals applied thereto or a time constant.

The sensing electrodes SE shown in FIG. 7B may output sensing signals different from each other in accordance with a pressure provided by the finger UF. The sensing electrodes SE may include materials in which a resistance is varied according to the pressure applied thereto. That is, each of the sensing electrodes SE may be, but not limited to, a pressure sensing sensor.

The first group sensing electrodes SE have a resistance variation rate different from that of the second group sensing electrodes SE, and thus, the first group sensing electrodes SE output the sensing signals different from the sensing signals output from the second group sensing electrodes SE. The signal processor 121 (refer to FIG. 5) may obtain information regarding two knuckles UF-P based on the voltage level of the sensing signals applied thereto or a current intensity.

Figure 8A:
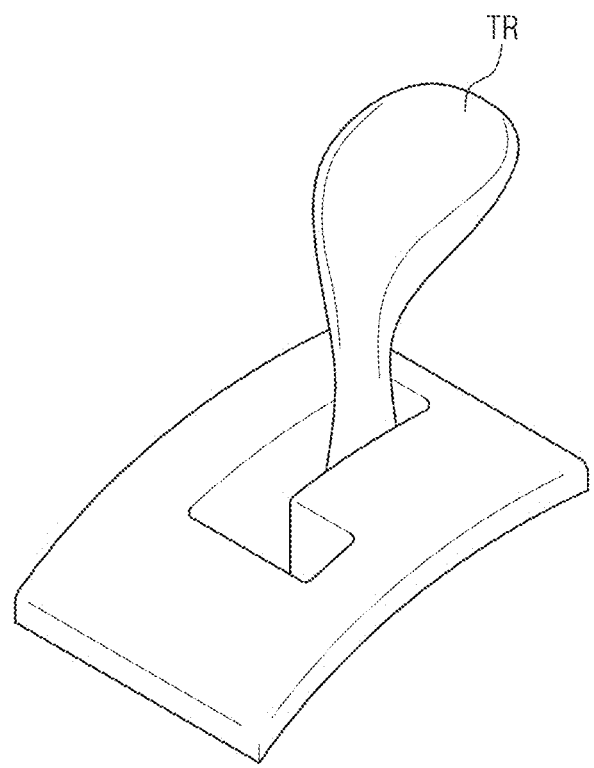
FIG. 8A is a perspective view showing a user authentication device used with a component of a vehicle according to an exemplary embodiment.
Figure 8B:
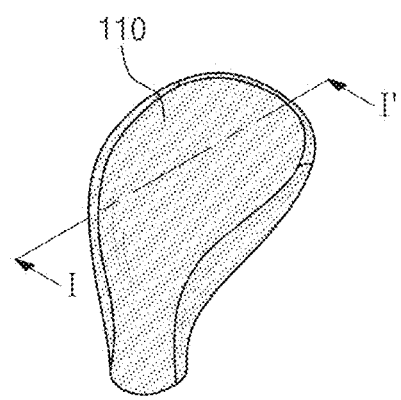
FIG. 8B is a perspective view showing an input sensing module installed in the component of the vehicle shown in FIG. 8A.
Figure 8C:
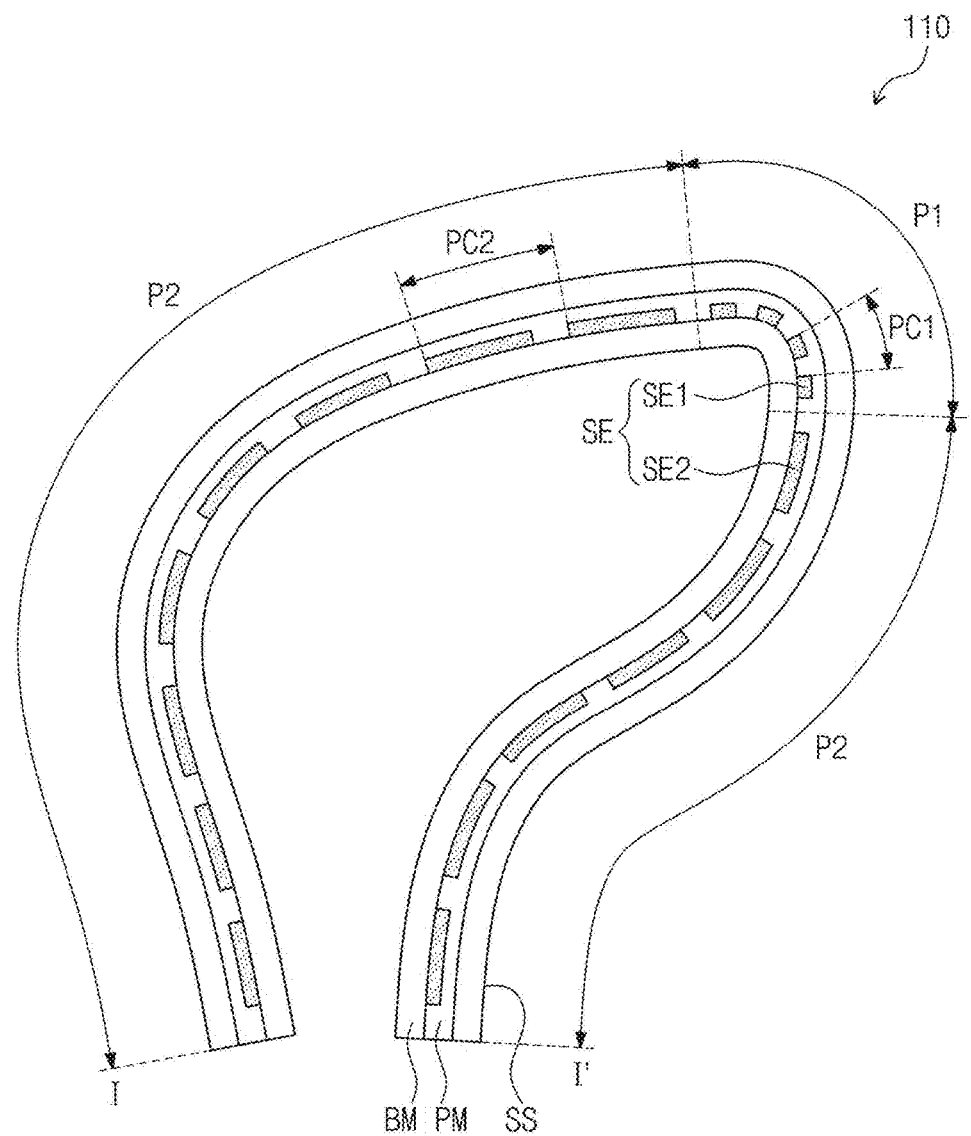
FIG. 8C is a cross-sectional view taken along a line I-I' of FIG. 8B.
Figure 8D:
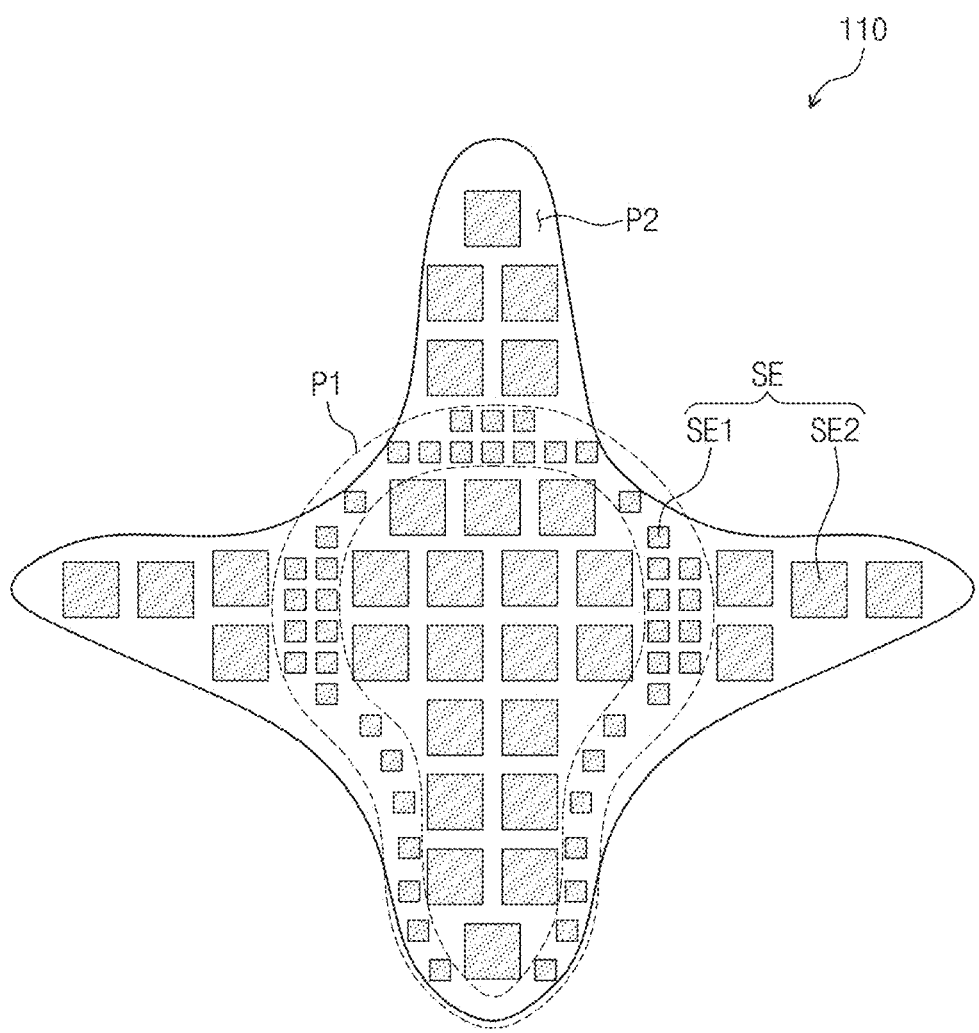
FIG. 8D is a view showing an input sensing module in a spread state according to an exemplary embodiment.

FIG. 8A is a view showing a component TR of a vehicle applied with a user authentication device according to an exemplary embodiment. FIG. 8B is a view showing an input sensing module 110 installed in the component TR of the vehicle shown in FIG. 8A. FIG. 8C is a cross-sectional view taken along a line I-I' of FIG. 8B. FIG. 8D is a view showing the input sensing module 110 in a spread state according to an exemplary embodiment. In the present exemplary embodiment, the transmission lever TR will be described as the component of the vehicle.

The component of the vehicle, e.g., the transmission lever TR, has a three-dimensional shape to allow the user, i.e., driver, to hold the component. The input sensing module 110 has a shape corresponding to an appearance of the transmission lever TR. The input sensing module 110 provides a sensing surface SS having a three-dimensional shape. The sensing surface SS provides the three-dimensional shape similar to an outer surface of the transmission lever TR.

The structure in which the input sensing module 110 is installed on the transmission lever TR should not be limited to a specific structure. For instance, the input sensing module 110 may be coupled to the outer surface of the transmission lever TR. In addition, the input sensing module 110 may be one of components of the transmission lever TR. The input sensing module 110 may be applied to as an exterior configuration of the transmission lever TR.

Hereinafter, the structure of the input sensing module 110 will be described in detail with reference to FIGS. 8C and 8D.

Referring to FIGS. 8C and 8D, the input sensing module 110 includes a flexible base member BM, a plurality of sensing electrodes SE arranged on the base member BM, and a flexible protective member PM disposed above the base member BM to protect the sensing electrodes SE. The protective member PM may provide the sensing surface SS having the three-dimensional shape.

Although not shown separately, the input sensing module 110 may further include a plurality of signal lines connected to the sensing electrodes SE. The detecting signal may be applied to the sensing electrodes SE through the signal lines or the sensing signal may be read out through the signal lines. In addition, the control module 120 (refer to FIG. 1) may be provided in the form of an integrated circuit chip and electrically connected to the signal lines through a flexible circuit board (not shown).

Each of the base member BM and the protective member PM is flexible, and to this end, each of the base member BM and the protective member PM includes one of a polydimethylsiloxane film (PDMS), a plastic film, a self-restoring film, a fabric, and a leather.

The material for the sensing electrodes SE may be determined depending on the sensing method of the input sensing module 110 with respect to an external input. The input sensing module 110 senses the external input through the electrostatic capacitance method as described with reference to FIG. 7A, or the input sensing module 110 senses the external input through the pressure sensing method as described with reference to FIG. 7B.

The electrostatic capacitance type sensing electrodes SE include conductive material. The conductive material may have high flexibility, e.g., graphene, a carbon nanotube, a metal nanowire, a conductive fiber, or a conductive polymer.

The pressure sensing type sensing electrodes SE include the materials in which the resistance is varied according to the pressure applied thereto. For instance, examples of the pressure sensing type sensing electrodes SE may include a piezoelectric material, a carbon powder, a quantum tunnelling composite (QTC), a silver nanoparticle, a crystalline or polycrystalline silicon, or an electric active polymer. The carbon nanotube, the graphene, or the metal nanowire may form the pressure sensing type sensing electrodes SE because the carbon nanotube, the graphene, or the metal nanowire is flexible and has resistance that varies in accordance with the pressure applied thereto.

The shape of the sensing electrodes SE should not be limited to a certain shape. The sensing electrodes SE may include two kinds of sensing electrodes SE. The electrostatic capacitance type sensing electrodes SE may include only one kind of electrode or two kinds of electrodes depending on the sensing method (e.g., a self-capacitance method or a mutual-capacitance method).

As shown in FIGS. 8C and 8D, the input sensing module 110 may include a plurality of portions distinguished from each other according to an average curvature. The portions may include a plurality of variation portions. The portions may also include flat portions. In the present exemplary embodiment, the input sensing module 110 is divided into two portions. Because the input sensing module 110 is divided into the two portions, each of the base member BM and the protective member PM may also be divided into two portions corresponding to the two portions of the input sensing module 110.

The input sensing module 110 includes a first portion P1 having a first average curvature and a second portion P2 having a second average curvature smaller than the first average curvature. The base member BM includes a first base portion corresponding to the first portion P1 and a second base portion corresponding to the second portion P2, and the protective member PM includes a first protective portion corresponding to the first portion P1 and a second protective portion corresponding to the second portion P2.

The sensing electrodes SE include first sensing electrodes SE1 arranged in the first portion P1 and second sensing electrodes SE2 arranged in the second portion P2. The first sensing electrodes SE1 have a first pitch PC1, and the second sensing electrodes SE2 have a second pitch PC2 greater than the first pitch PC1. Each of the first and second pitches PC1 and PC2 is defined by a sum of a width of an electrode and a distance between electrodes adjacent to each other. Each of the first and second pitches PC1 and PC2 corresponds to an average value, and the first pitch PC1 of the first sensing electrodes SE1 should not be limited to a constant value. In addition, the second pitch PC2 of the second sensing electrodes SE2 should not be limited to a constant value.

The sensing electrodes SE having the relatively smaller pitch are arranged in the portion having the relatively larger average curvature, and thus, information regarding a portion of the palm input to the variation portions may be precisely detected. Accordingly, although the input sensing module 110 has a three-dimensional shape, the sensing sensitivity may be improved regardless of sensing areas. In addition, because the sensing electrodes having the smaller pitch are arranged in the portion having a relatively larger curvature, the sensing electrodes may be prevented from being damaged as a result of stress.

Figure 9A:
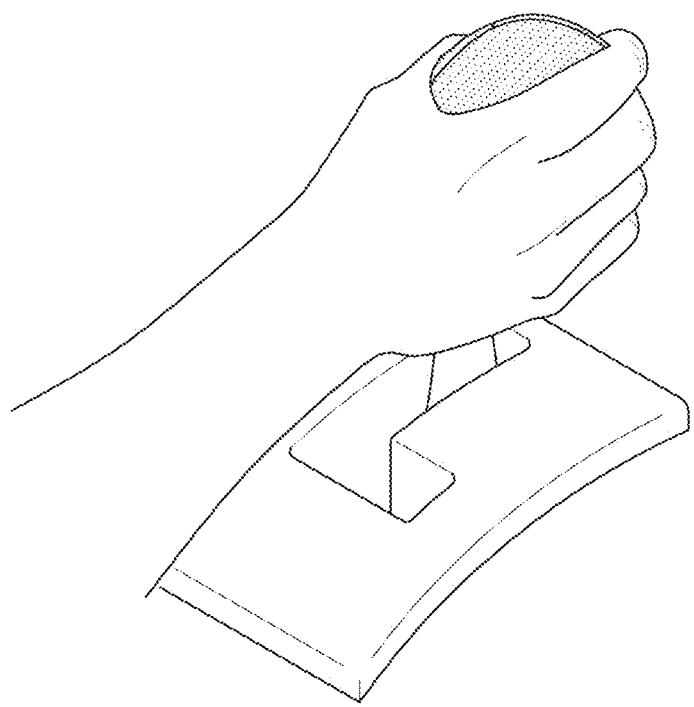
FIG. 9A, FIG. 9B, and FIG. 9C are perspective views showing various examples of the user's hand holding the component of the vehicle shown in FIG. 8A.
Figure 9B:
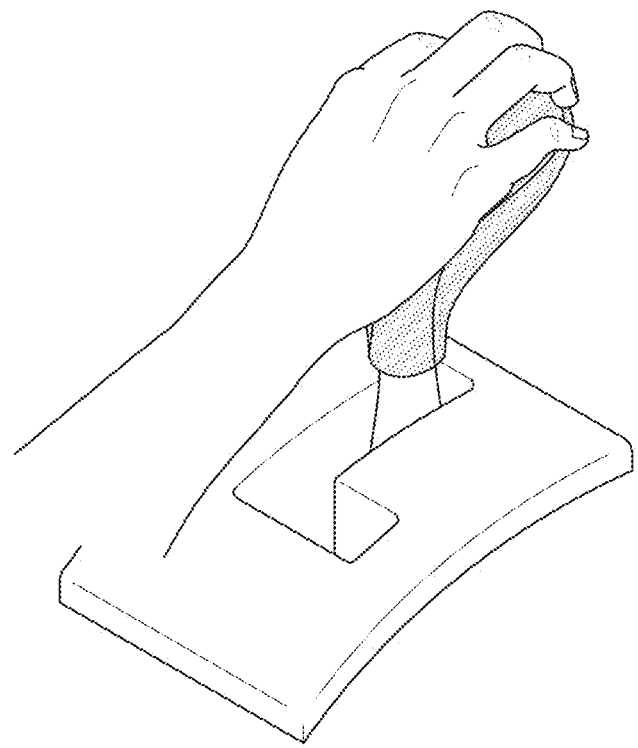
Figure 9C:
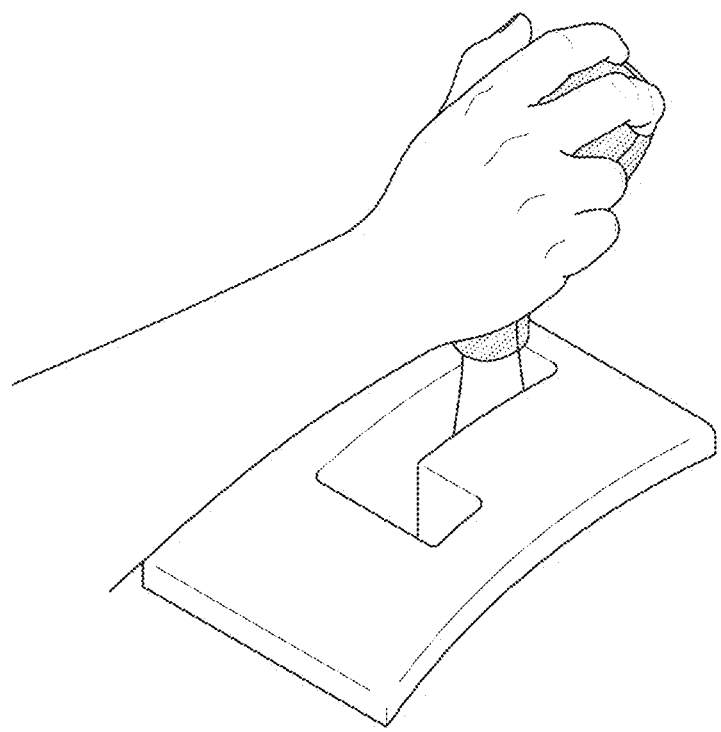

FIGS. 9A to 9C are views showing various examples of the user's hand holding the component of the vehicle shown in FIG. 8A. Because actions of the user who gets in the vehicle are not always the same, the user may hold the transmission lever TR in various ways, as shown in FIGS. 9A to 9C.

According to the present disclosure, the user authentication may be carried out during the user's natural behavior. Because the same user authentication is executed even though the user holds the transmission lever TR in various ways, the user does not recognize the execution of the user authentication.

Referring to FIGS. 9A to 9C, although the user holds the transmission lever TR in various ways, some of the information regarding the entire palm described with reference to FIG. 6B is input to the input sensing module 110. Different authentication information groups may be input to the input sensing module 110 in accordance with the way of holding. The information regarding the entire palm stored in the memory 122 (refer to FIG. 5) is compared with the palm information input in accordance with the way of holding, and the authentication signal is generated when the number of data points of palm information input consistent with the stored data point information regarding the entire palm is equal to or greater than a predetermined reference number according to the compared result. The predetermined reference number may be set by the vehicle owner through the vehicle control system 1000. Thus, the user authentication may be constantly executed even though the user holds the transmission lever TR in various ways.

Figure 10A:
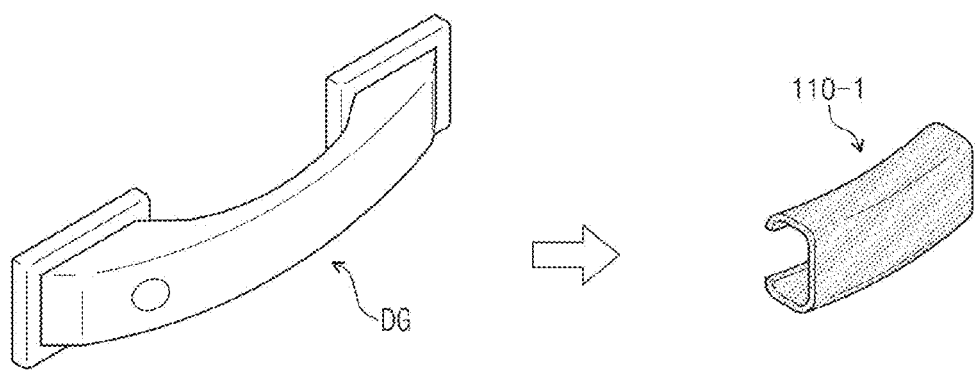
FIG. 10A, FIG. 10B, and FIG. 10C are perspective views showing various examples of input sensing modules in accordance with shapes of components of the vehicle.
Figure 10B:
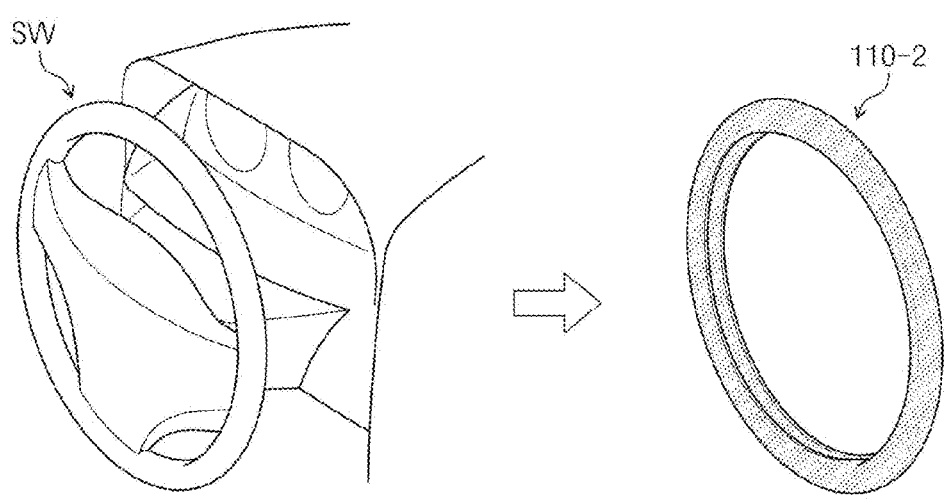
Figure 10C:
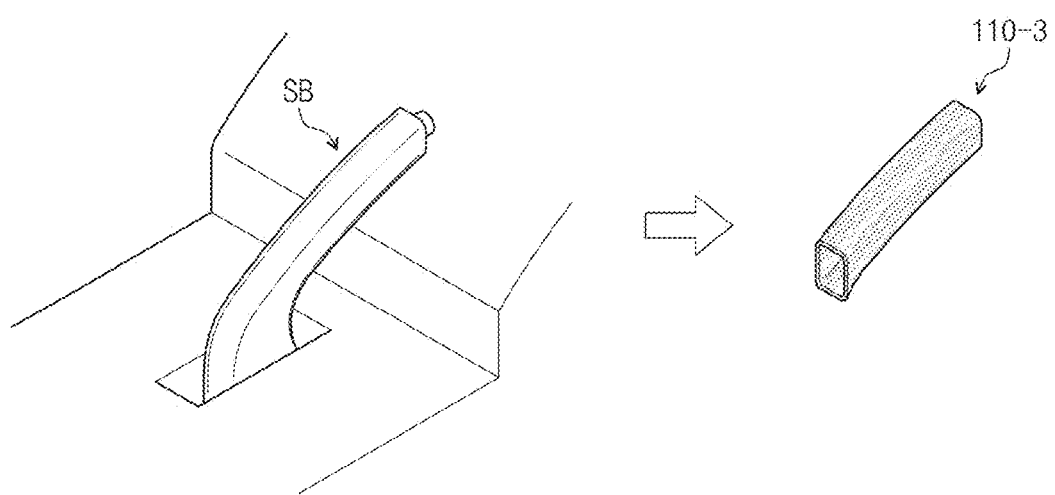

FIGS. 10A to 10C are views showing various examples of input sensing modules 110-1, 110-2, and 110-3 in accordance with shapes of components of the vehicle.

Referring to FIG. 10A, an input sensing module 110-1 having a cover shape may be installed on the door grip DG. As shown in FIG. 10B, an input sensing module 110-2 having a ring shape may be installed on the handle HD. As shown in FIG. 10C, an input sensing module 110-3 having a tunnel shape may be installed on the side brake SB.

As described above, the input sensing modules 110-1, 110-2, and 110-3 may have three-dimensional shapes corresponding to the shapes of the components of the vehicle.

According to the above, user authentication may be executed while the user does not recognize the user authentication. In other words, user authentication may be carried out through a user's natural behavior.

The pitches of the sensing electrodes are changed in accordance with the curvature of the sensing surface, and thus, the accuracy of the authentication may be improved. In addition, because the sensing electrodes having the relatively small pitch are arranged in the portion having a relatively large curvature, the sensing electrodes may be prevented from being damaged as a result of stress.

Although certain exemplary embodiments and implementations have been described herein, other embodiments and modifications will be apparent from this description. Accordingly, the inventive concept is not limited to such embodiments, but rather to the broader scope of the presented claims and various obvious modifications and equivalent arrangements.

What is claimed is:

1. A user authentication device, comprising:
an input sensing module comprising a sensing surface with which a palm of a user is placed in contact to provide input palm information, the sensing surface having a three-dimensional shape; and
a control module configured to compare the input palm information sensed by the input sensing module with stored user palm information to output an authentication signal when a number of data points of the input palm information consistent with the stored user palm information is equal to or greater than a predetermined number,
wherein the stored user palm information comprises lengths of fingers, shapes of fingers, widths of finger knuckles, lengths of palm lines, shapes of palm lines, lengths between the finger knuckles adjacent to each other, and associative relations between the finger knuckles corresponding to each of other adjacent fingers.

2. The user authentication device of claim 1, wherein the input sensing module comprises:
a flexible base member;
a plurality of sensing electrodes disposed on the flexible base member; and
a flexible protective member disposed on the flexible base member, having the sensing surface, and protecting the sensing electrodes.

3. The user authentication device of claim 2, wherein:
the flexible base member comprises a first base portion having a first average curvature and a second base portion having a second average curvature smaller than the first average curvature; and
the sensing electrodes comprise first sensing electrodes disposed in the first base portion and second sensing electrodes disposed in the second base portion, the first sensing electrodes having a first pitch, and the second sensing electrodes having a second pitch greater than the first pitch.

4. The user authentication device of claim 3, wherein the flexible protective member comprises a first protective portion corresponding to the first base portion and a second protective portion corresponding to the second base portion.

5. The user authentication device of claim 2, wherein the sensing electrodes are capacitively coupled to the palm of the user.

6. The user authentication device of claim 5, wherein each of the sensing electrodes comprises at least one of graphene, a carbon nanotube, a metal nanowire, and a conductive polymer.

7. The user authentication device of claim 2, wherein the sensing electrodes comprise at least one of a piezoelectric material, a carbon powder, a quantum tunneling composite (QTC), a silver nanoparticle, a crystalline or polycrystalline silicon, and an electric active polymer.

8. The user authentication device of claim 2, wherein each of the flexible base member and the flexible protective member comprises at least one of a polydimethylsiloxane film (PDMS), a plastic film, a self-restoring film, a fabric, and a leather.

9. The user authentication device of claim 1, wherein the control module comprises:
a signal processor configured to generate the input palm information from the sensing signals provided from the input sensing module;
a memory configured to store the user palm information;
an information determiner configured to compare the user palm information with the input palm information and generate the authentication signal according to the compared result; and
an authentication signal transmitter configured to transmit the authentication signal.

10. A method of authenticating a user, comprising:
sensing an input by a palm of the user, which occurs by placing the palm of the user in contact with a sensing surface of an input sensing module to provide input palm information, the sensing surface having a three-dimensional shape;
comparing the input palm information sensed from the input sensing module with user palm information previously stored in a memory; and
generating an authentication signal when a number of data points of the input palm information consistent with the stored user palm information is equal to or greater than a predetermined number,
wherein the stored user palm information comprises lengths of fingers, shapes of fingers, widths of finger knuckles, lengths of palm lines, shapes of palm lines, lengths between the finger knuckles adjacent to each other, and associative relations between the finger knuckles corresponding to each of other adjacent fingers.

11. The method of claim 10, further comprising transmitting the authentication signal to an external electronic module.

12. An input sensing module comprising:
a flexible base member;
a plurality of sensing electrodes disposed on the flexible base member; and
a flexible protective member disposed on the flexible base member and protecting the sensing electrodes, the flexible protective member comprising a three-dimensional sensing surface with which a palm of a user is placed in contact,
wherein:
the sensing electrodes are capacitively coupled to the palm of the user;
the flexible base member comprises a first base portion having a first non-flat average curvature and a second base portion having a second non-flat average curvature smaller than the first average curvature;
the sensing electrodes comprise first sensing electrodes disposed in the first base portion and second sensing electrodes disposed in the second base portion, the first sensing electrodes have a first pitch, and the second sensing electrodes have a second pitch greater than the first pitch;
the first pitch is defined by a sum of a first width of an electrode of the first sensing electrodes and a first distance between the first sensing electrodes adjacent to each other; and
the second pitch is defined by a sum of a second width of an electrode of the second sensing electrodes and a second distance between the second sensing electrodes adjacent to each other.

13. The input sensing module of claim 12, wherein the flexible protective member comprises a first protective portion corresponding to the first base portion and a second protective portion corresponding to the second base portion.

14. The input sensing module of claim 12, wherein each of the sensing electrodes comprises at least one of graphene, a carbon nanotube, a metal nanowire, and a conductive polymer.

15. The input sensing module of claim 12, wherein each of the sensing electrodes comprises at least one of a piezoelectric material, a carbon powder, a quantum tunneling composite (QTC), a silver nanoparticle, a crystalline or polycrystalline silicon, and an electric active polymer.

16. The input sensing module of claim 12, wherein each of the flexible base member and the flexible protective member comprises at least one of a polydimethylsiloxane film (PDMS), a plastic film, a self-restoring film, a fabric, and a leather.

17. The user authentication device of claim 3, wherein the flexible protective member comprises a first protective portion overlapping the first base portion and a second protective portion overlapping the second base portion.

18. The input sensing module of claim 12, wherein the flexible protective member comprises a first protective portion overlapping the first base portion and a second protective portion overlapping the second base portion.

19. A user authentication device, comprising:
an input sensing module comprising a sensing surface with which a palm of a user is placed in contact to provide input palm information, the sensing surface having a three-dimensional shape; and
a control module that compares the input palm information sensed by the input sensing module with stored user palm information to output an authentication signal when a number of data points of the input palm information equivalent to data points in the stored user palm information is equal to or greater than a predetermined number,
wherein the stored user palm information comprises lengths of fingers, shapes of fingers, widths of finger knuckles, lengths of palm lines, shapes of palm lines, lengths between the finger knuckles adjacent to each other, and associative relations between the finger knuckles corresponding to each of other adjacent fingers.

20. The user authentication device of claim 19, wherein the control module comprises:
a signal processor that generates the input palm information from sensing signals provided from the input sensing module;
a memory that stores the user palm information;
an information determiner that compares the user palm information with the input palm information and generates the authentication signal according to the compared result; and
an authentication signal transmitter that transmits the authentication signal.

21. A method of authenticating a user, comprising:
sensing an input by a palm of the user, which occurs by placing the palm of the user in contact with a sensing surface of an input sensing module to provide input palm information, the sensing surface having a three-dimensional shape;
comparing the input palm information sensed from the input sensing module with user palm information previously stored in a memory; and
generating an authentication signal when a number of data points of the input palm information equivalent to data points in the stored user palm information is equal to or greater than a predetermined number,
wherein the stored user palm information comprises lengths of fingers, shapes of fingers, widths of finger knuckles, lengths of palm lines, shapes of palm lines, lengths between the finger knuckles adjacent to each other, and associative relations between the finger knuckles corresponding to each of other adjacent fingers.

22. The input sensing module of claim 12, wherein the first distance is less than the second distance.

23. The input sensing module of claim 12, wherein each of the first base portion and the second base portion has a convex shape.

* * * * *